US012724311B1

(12) United States Patent
Saxena et al.

(10) Patent No.: US 12,724,311 B1
(45) Date of Patent: Sep. 1, 2026

(54) LIQUID CRYSTAL MIXTURE FOR A SPATIAL LIGHT MODULATOR

(71) Applicant: Dualitas Ltd, Milton Keynes (GB)

(72) Inventors: Antariksh Saxena, Milton Keynes (GB); Sandra Sanni, Milton Keynes (GB); Mamatha Nagaraj, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 0 days.

(21) Appl. No.: 19/292,078

(22) Filed: Aug. 6, 2025

(30) Foreign Application Priority Data

May 30, 2025 (GB) ..................................... 2508444

(51) Int. Cl.
*G02F 1/135* (2006.01)
*G02B 27/01* (2006.01)

(52) U.S. Cl.
CPC ....... *G02F 1/1358* (2013.01); *G02B 27/0103* (2013.01); *G02B 2027/0109* (2013.01)

(58) Field of Classification Search
CPC .............. G02F 1/1358; G02B 27/0103; G02B 2027/0109
USPC .......................................................... 349/129
See application file for complete search history.

(56) References Cited

U.S. PATENT DOCUMENTS 9,723,769 B2 * 8/2017 Lee ................... G02F 1/133753
12,187,945 B1 1/2025 Pecinovsky
2014/0253987 A1 9/2014 Christmas
2015/0022526 A1 1/2015 Christmas
2015/0198855 A1 * 7/2015 Kim .................. G02F 1/133707 349/182
2025/0075128 A1 * 3/2025 Glaser ................ C09K 19/0225
2025/0224635 A1 * 7/2025 Wu ....................... G02F 1/1337

FOREIGN PATENT DOCUMENTS

CN 118085885 B 9/2024
EP 4478124 A1 12/2024
WO WO-2022075207 A1 * 4/2022 ........... B60K 35/233

OTHER PUBLICATIONS

PE2E English translation of WO2022075207A1 (Year: 2022).*
Combined Search and Examination Report in UK patent Application GB2508444.3, dated Nov. 13, 2025.

(Continued)

*Primary Examiner* — David Y Chung
(74) *Attorney, Agent, or Firm* — McDonnell Boehnen Hulbert & Berghoff LLP

(57) ABSTRACT

A spatial light modulator for a holographic head-up display in a vehicle, comprising: a first substrate, and a second substrate opposing the first substrate; a first alignment layer disposed on the first substrate, and a second alignment layer disposed on the second substrate; and a liquid crystal mixture provided between the first alignment layer and the second alignment layer, wherein the liquid crystal mixture comprises: a first liquid crystal component having a nematic phase in a first temperature range; and a second liquid crystal component having a ferroelectric nematic phase in a second temperature range, wherein the first temperature range and second temperature range at least partially overlap in a third temperature range.

20 Claims, 16 Drawing Sheets

(56) References Cited

OTHER PUBLICATIONS

Nazarenko, K.G. et al., "Chiral Ferronematic Liquid Crystals: a Physico-chemical Analysis of Phase Transitions and Induced Helical Twisting," 21 pages, Institute for Scintillation Materials of the National Academy of Sciences of Ukraine, ND, available at https://arxiv.org/abs/2206.07508 (2022).

Zhecong, Zhu et al., Electro-optic Study of the Phase Behavior of Mixtures of Two Ferroelectric Nematic Liquid Crystals, 1 page, APS March Meeting 2021 (2021).

* cited by examiner $K_{11}$(pN)

wt% DIO $K_{33}$(pN)

wt% DIO

FIGURE 12

LIQUID CRYSTAL MIXTURE FOR A SPATIAL LIGHT MODULATOR

CROSS-REFERENCE TO RELATED APPLICATIONS

This application claims the benefit of priority of United Kingdom Patent Application no. 2508444.3, filed May 30, 2025, which is hereby incorporated herein by reference in its entirety.

FIELD

The present disclosure relates to a spatial light modulator and a liquid crystal mixture. More specifically, the present disclosure relates to forming a mixture of a nematic liquid crystal component and a ferroelectric nematic liquid crystal component and providing the mixture in a spatial light modulator for a holographic head-up display in a vehicle. Even more specifically, the present disclosure relates to phase matching the mixture of nematic and ferroelectric nematic liquid crystal components to provide a homogeneous and non-phase-separated nematic phase liquid crystal mixture.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

SUMMARY

Aspects of the present disclosure are defined in the appended independent claims.

Liquid crystal layers are commonly used as part of a spatial light modulator for holography applications, which tend to operate by application of an electric field to a layer of liquid crystal between two substrate layers. Since most liquid crystal molecules are either permanent dipoles or induced dipoles under application of an electric field, they can be rotated to change the effective refractive index of liquid crystals. In the case of an electrically addressed SLM, electrodes on a silicon wafer apply an electric field across a portion of the liquid crystal layer (e.g. in a liquid crystal on silicon, LCOS, SLM).

The electro-optical characteristics of the liquid crystal layer have a large impact on the overall performance of the spatial light modulator. In particular, the switching threshold voltage, on/off response times, and the amount of phase retardation are among the key characteristics which determine the performance and suitability of a liquid crystal for use in holography.

The threshold voltage for a liquid crystal cell is the minimum voltage required for the liquid crystal molecules to respond to an applied electric field and change their orientation. The threshold voltage generally depends upon the dielectric anisotropy $\Delta_\varepsilon$ of the liquid crystal, which describes the difference between the permittivity of the liquid crystal parallel to the director (a vector describing the preferred orientation of the liquid crystal molecules) and the permittivity of the liquid crystal perpendicular to the director. The dielectric anisotropy $\Delta_\varepsilon$ thus determines how the liquid crystal molecules respond to an applied electric field and thus influences the threshold voltage.

The on/off response times for a liquid crystal refer to how quickly the liquid crystal to change from one state to another (also referred to as rise and fall times). The response times are generally dependent upon the viscosity of the liquid crystal material, the cell gap, and the splay elastic constant $k_{11}$.

The amount of phase retardation provided by a liquid crystal SLM depends upon the birefringence $\Delta n$, which describes the difference between the refractive index of the material in the ordinary and extraordinary different directions. The amount of phase retardation is therefore an important factor for SLM applications, since it determines the achievable modulation depth.

Phase-only holography techniques using an LCOS device generally use nematic liquid crystals due to high birefringence and multilevel phase modulating ability. A suitable liquid crystal layer for an LCOS device requires a liquid crystal cell with minimal thickness, large splay elastic constant, a $2\pi$ modulation depth at low driving voltages, and a small dielectric constant ratio. However, the optical response time of a device using nematic liquid crystals may decrease for several reasons. Firstly, the viscous dragging force prevents the liquid crystal from rapidly switching back to its "relaxed" state when an applied voltage is removed. Secondly, the molecules in the middle of the liquid crystal layer may be forced to relax in the opposite direction due to asymmetric backflow of liquid crystal molecules in the two adjacent sub-layers. As a result of this, the off-time of the device, when the voltage is removed, will be much longer than the on-time, when the voltage is applied, which causes longer refresh times as well as blurring of images. Therefore, it is generally desirable to develop liquid crystal materials with high $\Delta_\varepsilon$, high $\Delta n$ and low viscosity.

Nematic liquid crystals are defined by their long-range orientational order and lack of long-range positional order. Ferroelectric nematic liquid crystals are a recently discovered class of materials, and similarly to nematic liquid crystals, they exhibit long-range orientational order. However, in the so-called ferroelectric nematic (Nf) phase, these materials are also capable of spontaneous electric polarisation due to the molecules having a strong electric dipole. In the Nf phase, the electric dipoles of the molecules are also aligned with the director vector, resulting in a net electric dipole moment coupled to the long-range orientational order of the liquid crystal. This Nf phase is present in materials in a particular phase space, for example in a particular temperature range. Materials having an Nf phase may also exhibit other known liquid crystal phases (e.g. nematic, smectic, isotropic, crystalline) at other temperatures.

It has been found that Nf liquid crystals, in isolation, are more sensitive to electric fields than non-polar nematic liquid crystals, and are seen to exhibit high dielectric anisotropy. However, Nf materials on their own have been found to have compromised performance and limited use for LCOS applications due to relatively low birefringence and high viscosity, thus failing to meet the $2\pi$ modulation depth and high speed switching required for real-time holographic applications.

In summary, the present inventors have discovered that nematic liquid crystals can be mixed with (or doped with) liquid crystals exhibiting an Nf phase in order to improve both the threshold voltage and the response times of the mixture.

Although it has previously been disclosed in European patent application publication EP4478124A1 that phase-separated mixtures of nematic and Nf liquid crystals may be formulated (whereby the Nf liquid crystal forms nano-domains), the present inventors have identified that further improved performance can be achieved by "phase-matching" the nematic and Nf components of the mixture such that the temperature range of the nematic phase of the first liquid crystal component overlaps the Nf phase of the second liquid crystal component. Furthermore, by mixing a high-birefringence nematic liquid crystal (e.g. $\Delta n > 0.25$), the inventors have been able to formulate a mixture that is suitable for holography applications with improved electro-optical characteristics compared to the components of the mixture in isolation.

In addition to the improvements identified by the inventors in relation to mixing nematic and ferroelectric nematic liquid crystals, further improvements have been identified by the inventors for reducing the threshold voltage in liquid crystal cells by manipulating the pre-tilt of alignment layers of a liquid crystal cell.

The person skilled in the art of liquid crystal displays will be familiar with the concept of alignment layers and pre-tilt angles. The present disclosure relates to nematic and ferro-electric-nematic liquid crystal material comprising rod-shaped molecules. When such material is aligned (e.g. by being placed proximate an alignment layer formed by e.g. rubbing), the aligned molecules exhibit both in-plane and out-of-plane orientations of the rods. If the alignment layer has been formed by rubbing, the in-plane alignment direction of the rods is generally the same as the rubbing direction. The average out-of-plane tilt angle (the "polar angle") of the rods with respect to the substrate is the pre-tilt angle. In other word, the pre-tilt angle is the polar angle of the longitudinal axis of the liquid crystals proximate the corresponding alignment layer to the plane of the substrate. Alignment layers are commonly made using a polymer, such as polyimide. The value of the pretilt angle depends on the polymer used for the alignment layer, the rubbing conditions, and the liquid crystal used but is generally between 0 and 10 degrees.

The present inventors have identified that different alignment layer materials may have different associated pre-tilt angles, and that by mixing two different polymers having different pre-tilt angles, the resulting alignment layer can be "continuously tuned" to have a desired pre-tilt angle depending on the mixing ratio of the two materials, resulting in a reduction in threshold voltage and a reduction in on-response time, although with the trade-off of a reduction in the amount of achievable phase retardation. However, by combining "tuned" increased pre-tilt alignment layers with doping the nematic liquid crystal with Nf liquid crystal, an advantageous synergy is realised whereby dramatically reduced threshold voltages may be achieved.

According to a first aspect of the disclosure, there is provided a spatial light modulator for a holographic head-up display in a vehicle. The spatial light modulator comprises a first substrate and a second substrate opposing the first substrate. In some embodiments, the first and second substrates are substantially planar and are arranged to be substantially parallel to one another. In other words, each substrate has an inner face arranged to oppose the corresponding inner face of the other substrate, the inner faces being parallel to one another. In some embodiments, the first substrate is a glass cover, and the second substrate is a silicon backplane. In some embodiments, the first substrate includes a common electrode layer (e.g. ITO) on the inner face of the first substrate, and the second substrate includes a metal electrode on the inner face of the second substrate (e.g. an aluminium electrode/pixel layer). The spatial light modulator comprises a first alignment layer disposed on the first substrate, and a second alignment layer disposed on the second substrate. In other words, the first alignment layer may be disposed on the common electrode layer and the second alignment layer may be disposed on the metal electrode layer. In some embodiments, the first and second alignment layers are formed of a polymer, e.g. polyimide, and may be arranged to have parallel or anti-parallel rubbing directions. In other words, each of the first and second alignment layers may impart a corresponding pre-tilt. The spatial light modulator further comprises a liquid crystal mixture provided between the first alignment layer and the second alignment layer. The liquid crystal mixture comprises a first liquid crystal component having a nematic phase in a first temperature range, and a second liquid crystal component having a ferroelectric nematic phase in a second temperature range. The first temperature range and the second temperature range at least partially overlap in a third temperature range. In other words, in the third temperature range the first liquid crystal component and the second liquid crystal component exist in a nematic phase and ferroelectric nematic phase, respectively, when not mixed (i.e. when separate). However, it can be understood that the resultant mixture may be (purely) in a nematic phase in the third temperature range. In some embodiments, the third temperature range may be a range of approximately 50 degrees Celsius, for example. It can also be understood that the concentration of the second liquid crystal component is another factor that affects whether the mixture phase separates-if the dopant concentration is high enough the mixture may phase separate. The present disclosure relates to non-phase separated mixtures, and so the skilled person would understand that an appropriate concentration of the second liquid crystal component should be selected.

The liquid crystal mixture identified by the inventors provides a number of advantages compared to conventional nematic liquid crystals used for holography applications. The addition of a ferroelectric nematic liquid crystal component allows for a decreased threshold voltage without any substantial negative effect on response times due to the increase in dielectric anisotropy offered by the Nf phase liquid crystal. Furthermore, the resultant mixture of the first and second components can be said to exist in the nematic phase, such that the liquid crystal mixture behaves in a similar way as conventional nematic liquid crystal but with enhanced electro-optical properties. Increases in these electro-optical properties improve with increased concentration of the Nf component of the mixture. Significant increases in these properties have been achieved in mixtures without phase separation. The maximum concentration achievable without phase separation is dependent upon the choice of materials, but significant improvements have been observed across a number of different combinations, with the highest Nf concentrations being observed when using DIO as the second liquid crystal component (i.e. as a dopant).

Another benefit of the present disclosure is that since the mixture of nematic and Nf liquid crystals is not phase-separated (e.g. into nano-, micro- or macro-domains) when the components are "phase matched", the mixture remains stable over time, as opposed to phase-separated mixtures where even very small nanoscale Nf phase domains may grow, leading to large scale (e.g. macro) phase separated domains, which would render the mixture unusable for holographic head-up display applications (e.g. in an automotive head-up display where reliability is critical and where the device is subject to large variations in temperature).

In some embodiments, the first liquid crystal component and second liquid crystal component form a homogeneous mixture in the third temperature range. In other words, the two components mix evenly throughout the liquid crystal mixture. In some embodiments, the mixture of the first and second liquid crystal components is eutectic.

In some embodiments, the first liquid crystal component and second liquid crystal component form a non-phase-separated nematic phase mixture in the third temperature range. In other words, the mixture does not phase separate or form phase-separated domains in the third temperature range. The presence or lack of phase separation can be measured/confirmed by differential scanning calorimetry, for example.

In some embodiments, the second liquid crystal component comprises a fluorinated ferroelectric nematic molecule. In some further embodiments, the second liquid crystal component comprises DIO, i.e. 3-fluoro-4-(3,4,5-trifluorophenyl)phenyl 2,6-difluoro-4-(trans-5-n-propyl-1,3-dioxane-2-yl)benzoate, or members of the DIO family/series/group. The inventors found that DIO provides a strong electronegative head group which may bond to the host liquid crystal (i.e. the first liquid crystal component), such that DIO forms a homogeneous non-phase-separated mixture with the first liquid crystal component at high concentrations compared to other Nf phase materials. DIO was found to increase the dielectric anisotropy and hence decrease the threshold voltage of the host liquid crystal without phase separation.

In some embodiments, the second liquid crystal component comprises RM734, i.e. 4-[(4-nitrophenoxy) carbonyl]phenyl 2,4-dimethoxybenzoate. RM734 was found to provide similar benefits as DIO, although it was found to phase separate at concentrations above 4 wt %.

In some embodiments, the first liquid crystal component has a birefringence of at least 0.25, optionally at least 0.27, further optionally at least 0.30, measured at a wavelength of 650 nm. The first liquid crystal component may have a birefringence less than 0.7, optionally less than 0.5, at a wavelength of 650 nm. In other words, the host liquid crystal has a relatively high birefringence necessary for achieving the modulation depth for phase holography. High birefringence host liquid crystals may be necessary for phase holography applications since the addition Nf liquid crystals may at some concentrations lower the birefringence, so the birefringence of the host needs to be high enough that the reduced birefringence of the mixture is still high enough to achieve the required modulation depth with modest switching voltages.

In some embodiments, the liquid crystal mixture comprises at least 25% by weight of the second liquid crystal component (e.g. between 25 and 30%, between 25 and 35%, between 25 and 40%, between 25 and 45%, between 25 and 50%), optionally at least 27% by weight of the second liquid crystal component (e.g. between 27 and 30%, between 27 and 35%, between 27 and 40%, between 27 and 45%, between 27 and 50%). It was found that although the mixture may not phase separate above this concentration, the electro-optical benefits of adding the Nf component start to diminish. This concentration may be particularly preferred for embodiments where the second liquid crystal component is DIO.

In some embodiments, the liquid crystal mixture comprises less than 10% by weight of the second liquid crystal component (e.g. between 1 and 10%), such as between 2 and 6% by weight of the second liquid crystal component. It was found that in this concentration regime the decrease in birefringence of the mixture may be limited compared to the birefringence of higher dopant concentration mixtures.

In some embodiments, the first substrate and the second substrate are separated by a cell gap of less than 5 micrometres (e.g. between 1 and 5 micrometres), optionally less than 2 micrometres (e.g. between 1 and 2 micrometres). In other words, the cell gap is measured as the distance between the opposing inner faces of the first and second substrates.

In some embodiments, the first alignment layer and/or the second alignment layer comprises a mixture of a first polymer having an associated first pre-tilt angle and a second polymer having an associated second pre-tilt angle. In other words, the first polymer, if coated onto a substrate in isolation (i.e. without being mixed), has an associated first pre-tilt angle, and the second polymer, if coated onto a substrate in isolation (i.e. without being mixed), has an associated second pre-tilt angle, given that all other conditions (e.g. rubbing parameters) are the same for the coating of the first and second polymers. The first and second polymers may be first and second polyimides, for example. By mixing two different polymer alignment layer materials of different pre-tilts, the resultant pre-tilt of the mixture can be tuned to a desired pre-tilt depending on the requirements of the spatial light modulator. For example, a higher pre-tilt may result in a decreased threshold voltage, with the trade-off of a reduction in phase retardation amount. This embodiment may synergistically interact with embodiments where the liquid crystal mixture comprises between 2 and 6% by weight of the second liquid crystal component, which limits the decrease in the birefringence of the liquid crystal mixture compared to the first liquid crystal component, resulting in further significantly reduced threshold voltage, while limiting the reduction in birefringence.

In some embodiments, the first pre-tilt angle is between 2 and 5 degrees, and the second pre-tilt angle is substantially 90 degrees, e.g. between 85 and 95 degrees. In other words, the first polymer may be described as being a substantially planar (or shallow pre-tilt) alignment layer material, and the second polymer may be described as being a substantially vertical alignment layer material.

In some embodiments, the mixture of the first polymer and the second polymer comprises a concentration of 20% by volume or less (e.g. between 10 and 20%) of the second polymer, optionally 10% by volume or less of the second polymer. In some embodiments, the mixture of the first polymer and the second polymer comprises a concentration of 20% by weight or less (e.g. between 10 and 20%) of the second polymer, optionally 10% by weight or less (e.g. between 8 and 10%) of the second polymer. It was found that concentrations higher than this approach a threshold-less threshold, in that there was not clearly observed Freedericksz transition with applied electric field for concentrations higher than 20%.

In some embodiments, the mixture of the first polymer and the second polymer has an associated third pre-tilt angle, wherein the third pre-tilt angle is between the first pre-tilt angle and the second pre-tilt angle. In other words, the mixture of the first and second polymers results in an intermediate pre-tilt angle of the first and second pre-tilt angles.

According to a second aspect of the disclosure, there is provided a liquid crystal mixture. The liquid crystal mixture comprises a first liquid crystal component having a first nematic phase in a first temperature range. The liquid crystal mixture comprises a second liquid crystal component having a ferroelectric nematic phase in a second temperature range. The first temperature range and the second temperature range at least partially overlap in a third temperature range.

According to a third aspect of the disclosure, there is provided a holographic projector comprising a spatial light modulator (such as that described above in relation to the first aspect) configured to display a hologram (e.g. by applying a voltage across the first and second substrates to change the orientation of the liquid crystal molecules), and at least one light source configured to illuminate the spatial light modulator (e.g. the light source may be a coherent light source such as a laser or laser diode).

According to a fourth aspect of the disclosure, there is provided a method of holographic projection. The method includes providing a spatial light modulator (such as that described above in relation to the first aspect), maintaining the spatial light modulator at a temperature within the third temperature range (i.e. the temperature range in which the liquid crystal mixture is a non-phase-separated nematic phase liquid crystal mixture); applying a voltage pattern across the first substrate and second substrate to modulate the orientation of the liquid crystal mixture in accordance with a hologram (e.g. by applying various voltages to a pattern of electrodes deposited on one of the first or second substrates with a common electrode layer deposited on the other of the two substrates); and illuminating the spatial light modulator with coherent light to form a spatially modulated wavefront. The spatially modulated wavefront may then be propagated to an eye-box for viewing by a user (e.g. either in a hologram-to-eye arrangement or via a viewing screen such as a diffuser).

In some embodiments, the first liquid crystal component and second liquid crystal component form a homogeneous mixture in the third temperature range, optionally wherein the first liquid crystal component and second liquid crystal component form a non-phase-separated nematic phase mixture in the third temperature range.

According to some embodiments, there is provided a liquid crystal on silicon, "LCOS" spatial light modulator, "SLM", arranged for phase modulation, the LCOS SLM comprising: a pi-cell arrangement (i.e. parallel rubbed alignment layers); a pretilt less than 5 degrees; a cell gap less than 5 microns; and a liquid crystal having a birefringence greater than 0.2.

According to some embodiments, there is provided a method of inducing a switchable bend state in a pi-cell for phase modulation, the method comprising: forming a cell with a cell gap less than 5 microns; filling the cell with a liquid crystal having a birefringence greater than 0.2; and applying a parallel pretilt less than 5 degrees, wherein a voltage range of 6 volts provides a phase retardation range of at least $1.5\pi$. In some embodiments, the liquid crystal comprises the mixture of the first and/or second aspects.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

For example, the present disclosure is applicable to fully-complex holography in which two arrays of phase-modulating pixels are used.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Reference is made to "pixel repeat distance" which may also be referred to as "pixel pitch". The pixel pitch of an array of pixels is the straight-line distance between corresponding points of adjacent pixels. The term therefore reflects the periodicity of the array or frequency at which the pixels repeat. The pixel pitch comprises the sum of the pixel width and the interpixel gap. The present disclosure relates to a display device comprising an [x×y] array of pixels on a plane having a pixel pitch in the x-direction and a pixel pitch in the y-direction.

Unless stated otherwise, any birefringence value mentioned herein is the birefringence at a wavelength of 650 nm.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Embodiments of the disclosure are set out in the following numbered items, which may be combined in any number and in any combination not technically or logically inconsistent:

Item 1. A liquid crystal mixture comprising:
- a first liquid crystal component, the first liquid crystal component having a nematic phase in a first temperature range; and
- a second liquid crystal component, the second liquid crystal component having a ferroelectric nematic phase in a second temperature range,
- wherein the first temperature range and second temperature range at least partially overlap to define a third temperature range, such that within the third temperature range, the first liquid crystal component and second liquid crystal component form a non-phase-separated nematic phase liquid crystal mixture.

Item 2. A spatial light modulator comprising:
- a first substrate comprising a first surface;
- a second substrate comprising a second surface, the second substrate being positioned such that the second surface faces the first surface of the first substrate and is space apart therefrom to define a cell gap;
- a first alignment layer disposed on the first surface of the substrate, the first alignment layer being configured to align liquid crystal molecules in a predetermined orientation;
- a second alignment layer disposed on the second surface of the substrate; and
- a liquid crystal mixture disposed within the cell gap and between the first alignment layer and the second alignment layer, wherein the liquid crystal mixture is a non-phase separated mixture comprising:
  - a first liquid crystal component, the first liquid crystal component having a nematic phase in a first temperature range; and
  - a second liquid crystal component, the second liquid crystal component having a ferroelectric nematic phase in a second temperature range,
- wherein the first temperature range and second temperature range at least partially overlap to define a third temperature range, such that when mixed within the third temperature range, the first liquid crystal component and second liquid crystal component form a non-phase-separated nematic phase liquid crystal mixture.

Item 3. The spatial light modulator of any preceding Item, wherein the second liquid crystal component comprises a fluorinated ferroelectric nematic molecule, optionally wherein the second liquid crystal component comprises DIO, i.e. 3-fluoro-4-(3,4,5-trifluorophenyl)phenyl 2,6-difluoro-4-(trans-5-n-propyl-1,3-dioxane-2-yl)benzoate, or one or more members of the DIO family/series/group.

Item 4. The spatial light modulator of Item 1 or 2, wherein the second liquid crystal component comprises RM734, i.e. 4-[(4-nitrophenoxy) carbonyl]phenyl 2,4-dimethoxybenzoate.

Item 5. The spatial light modulator of any preceding Item, wherein the first liquid crystal component has a birefringence of at least 0.25, optionally at least 0.27, further optionally at least 0.30, measured at a wavelength of 650 nm, optionally between 0.25 and 0.5.

Item 6. The spatial light modulator of any preceding Item, wherein the liquid crystal mixture comprises at least 25% by weight of the second liquid crystal component, optionally between 25 and 30% by weight of the second liquid crystal component.

Item 7. The spatial light modulator of any of Items 1 to 5, wherein the liquid crystal mixture comprises less than 10% by weight of the second liquid crystal component, Item 8. The spatial light modulator of any of Items 1 to 5, wherein the liquid crystal mixture comprises between 2 and 6% by weight of the second liquid crystal component.

Item 9. The spatial modulator of any of Items 1 to 5, wherein a ratio of the first liquid crystal component to the second liquid crystal component is in the range of 95:5 to 5:95.

Item 10. The spatial light modulator of any of Items 1 to 5, wherein the liquid crystal mixture comprises between 1 and 10% by weight of the second liquid crystal component.

Item 11. The spatial light modulator of any of Items 1 to 5, wherein the liquid crystal mixture comprises between 2 and 6% by weight of the second liquid crystal component.

Item 12. The spatial light modulator of any preceding Item, wherein the cell gap between the first surface of the first substrate and the second surface of the second substrate is less than 5 micrometres, e.g. between 1 and 5 micrometres.

Item 13. The spatial light modulator of any preceding Item, wherein the first alignment layer and/or the second alignment layer comprises a mixture of a first polymer having an associated first pre-tilt angle and a second polymer having an associated second pre-tilt angle.

Item 14. The spatial light modulator of Item 13, wherein the first pre-tilt angle is between 2 and 5 degrees, and the second pre-tilt angle is substantially 90 degrees, e.g. between 85 and 95 degrees.

Item 15. The spatial light modulator of Item 13 or 14, wherein the mixture of the first polymer and the second polymer comprises a concentration of 20% by volume or less of the second polymer, optionally wherein the mixture of the first polymer and the second polymer comprises a concentration of between 10 and 20% by volume of the second polymer, optionally wherein the mixture of the first polymer and the second polymer comprises a concentration of between 10 and 20% by weight of the second polymer.

Item 16. The spatial light modulator of any of Items 13 to 15, wherein the mixture of the first polymer and the second polymer has an associated third pre-tilt angle, wherein the third pre-tilt angle is between the first pre-tilt angle and the second pre-tilt angle.

Item 17. A holographic projector comprising a spatial light modulator configured to display a hologram, and at least one light source configured to illuminate the spatial light modulator, wherein the spatial light modulator comprises:

a first substrate comprising a first surface;

a second substrate comprising a second surface, the second substrate being positioned such that the second surface faces the first surface of the first substrate and is space apart therefrom to define a cell gap;

a first alignment layer disposed on the first surface of the substrate, the first alignment layer being configured to align liquid crystal molecules in a predetermined orientation;

a second alignment layer disposed on the second surface of the substrate; and a liquid crystal mixture disposed within the cell gap and between the first alignment layer and the second alignment layer, wherein the liquid crystal mixture is a non-phase separated mixture comprising:

a first liquid crystal component, the first liquid crystal component having a nematic phase in a first temperature range; and a second liquid crystal component, the second liquid crystal component having a ferroelectric nematic phase in a second temperature range, wherein the first temperature range and second temperature range at least partially overlap to define a third temperature range, such that when mixed within the third temperature range, the first liquid crystal component and second liquid crystal component form a non-phase-separated nematic phase liquid crystal mixture.

Item 18. A method of holographic projection comprising:

providing a spatial light modulator comprising:

a first substrate comprising a first surface;

a second substrate comprising a second surface, the second substrate being positioned such that the second surface faces the first surface of the first substrate and is space apart therefrom to define a cell gap;

a first alignment layer disposed on the first surface of the substrate, the first alignment layer being configured to align liquid crystal molecules in a predetermined orientation;

a second alignment layer disposed on the second surface of the substrate; and a liquid crystal mixture disposed within the cell gap and between the first alignment layer and the second alignment layer, wherein the liquid crystal mixture is a non-phase separated mixture comprising:

a first liquid crystal component, the first liquid crystal component having a nematic phase in a first temperature range; and a second liquid crystal component, the second liquid crystal component having a ferroelectric nematic phase in a second temperature range, wherein the first temperature range and second temperature range at least partially overlap to define a third temperature range, such that when mixed within the third temperature range, the first liquid crystal component and second liquid crystal component form a non-phase-separated nematic phase liquid crystal mixture;

maintaining the spatial light modulator at a temperature within the third temperature range;

applying a voltage pattern across the first substrate and second substrate to modulate the orientation of the liquid crystal mixture in accordance with a hologram; and illuminating the spatial light modulator with coherent light to form a spatially modulated wavefront.

BRIEF DESCRIPTION OF THE DRAWINGS

Specific embodiments are described by way of example only with reference to the following figures:

FIG. 12 shows the change in splay and bend elastic constants for different concentrations of dopant DIO.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
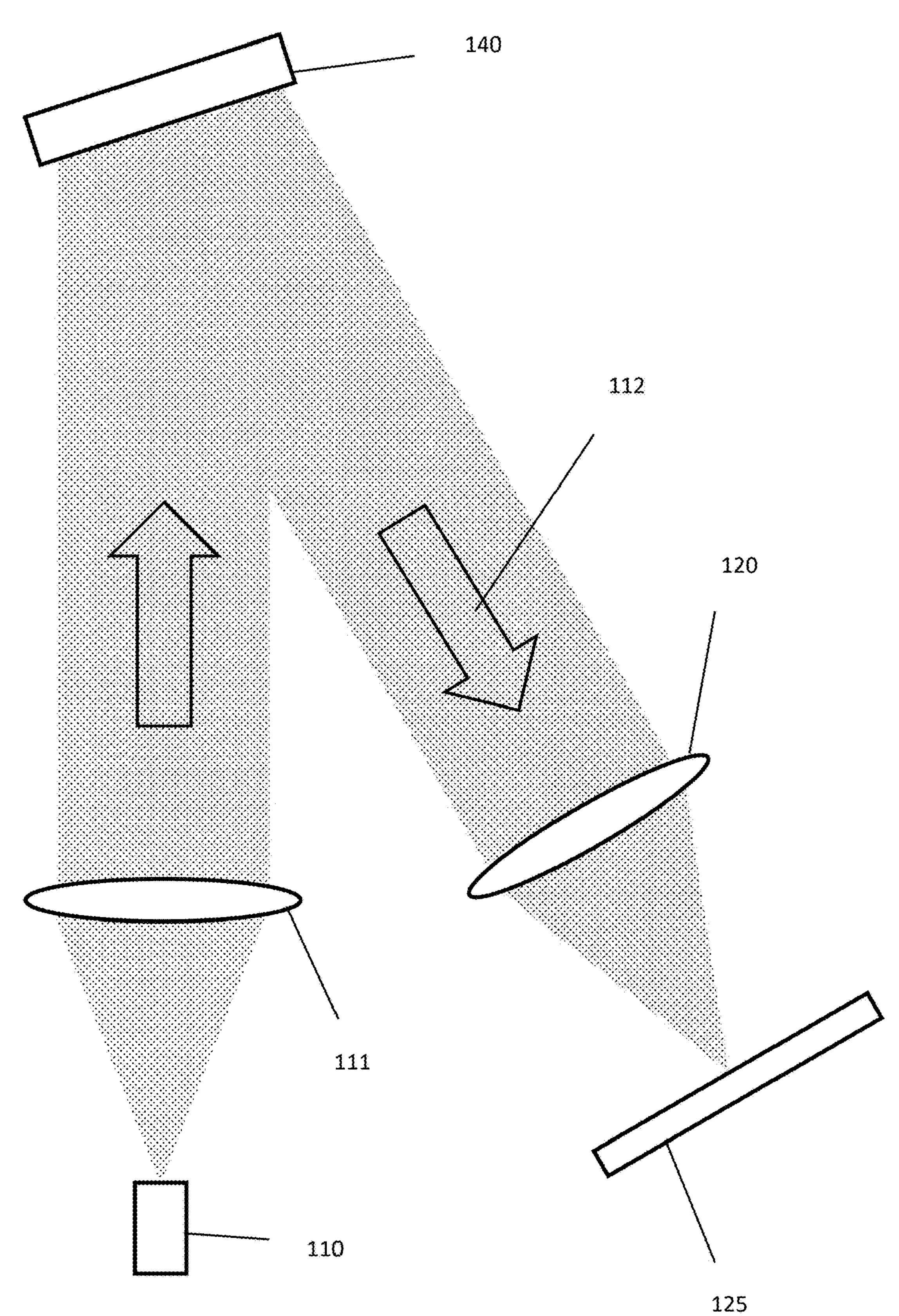
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in United Kingdom patents nos. 2,498,170 or 2,501,112, equivalent to U.S. Patent Application Publications nos. 2014/0253987A1 and 2015/0022526 A1, all of which are hereby incorporated in their entirety by reference. However, embodiments disclosed herein describe calculating a phase-only hologram by way of example only. In these embodiments, the Gerchberg-Saxton algorithm retrieves the phase information Ψ[u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information Ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
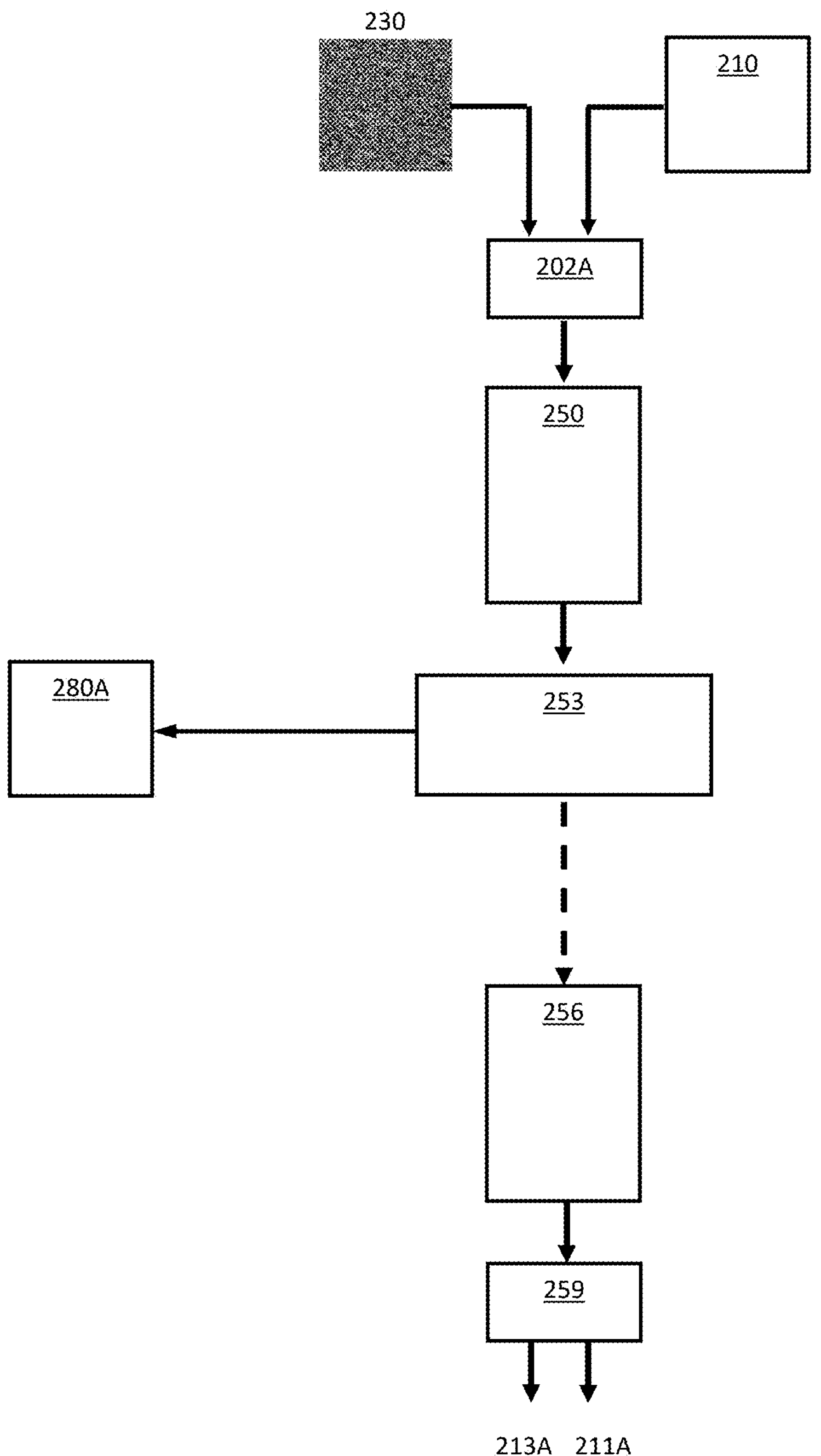
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
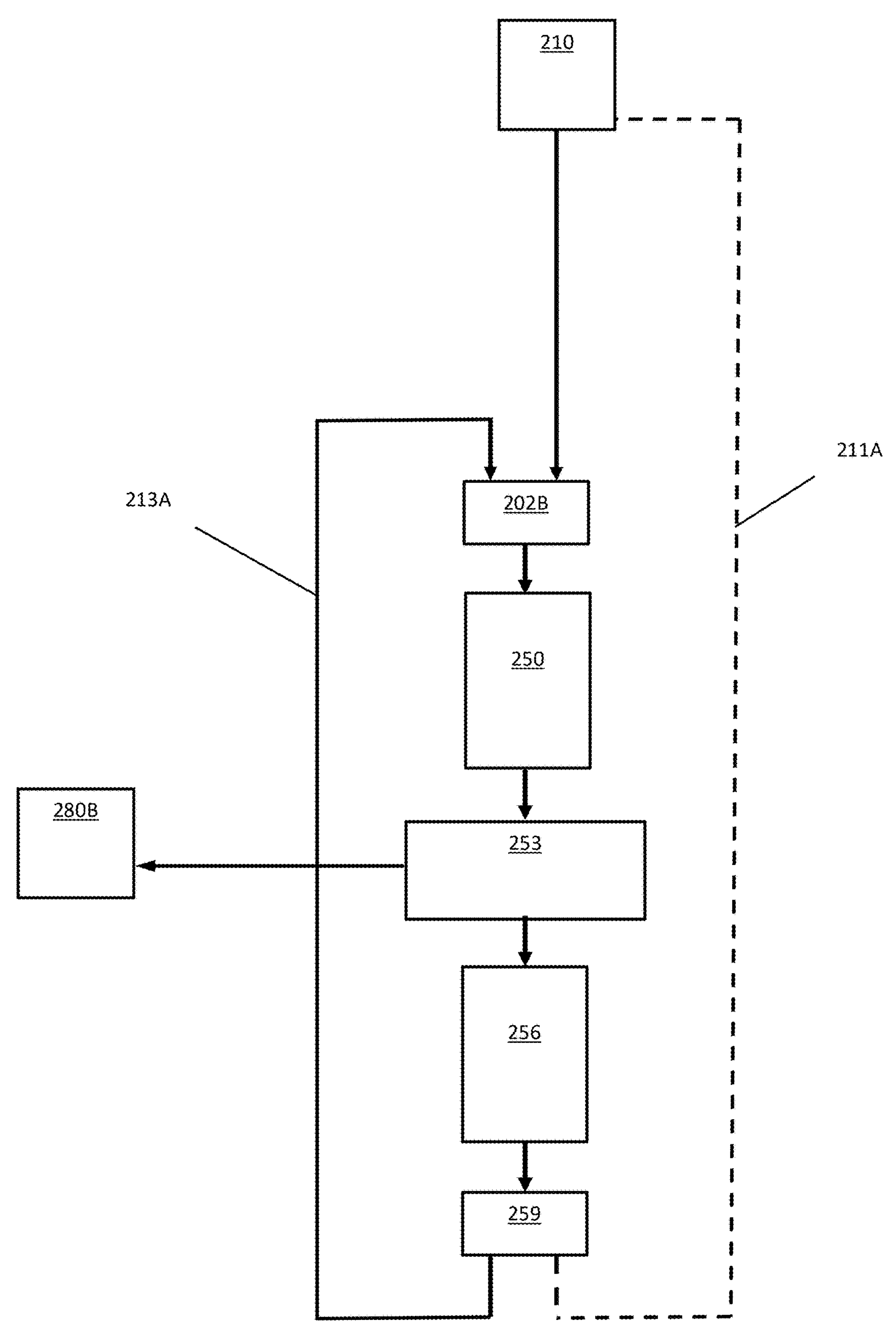
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
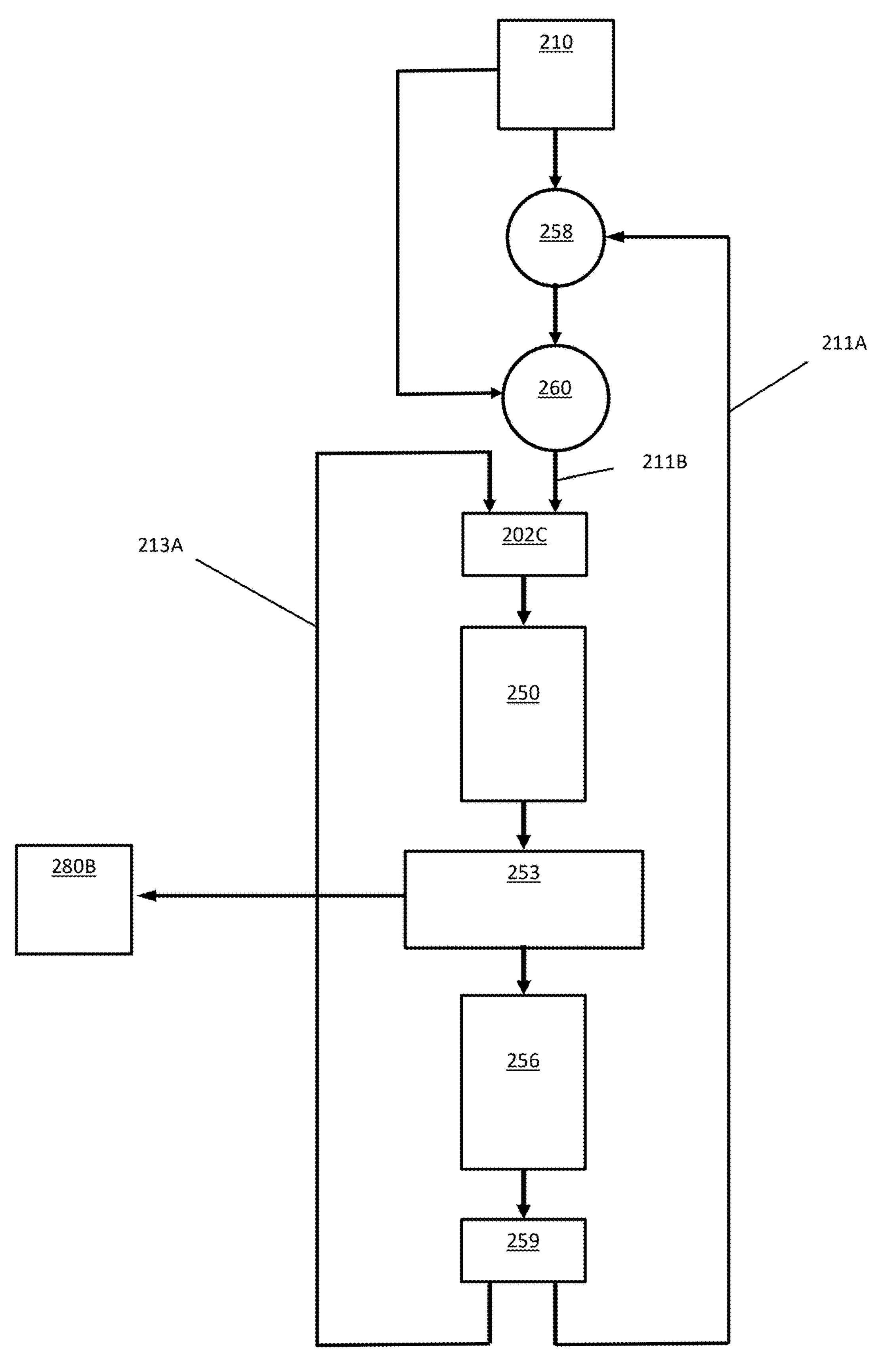
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ[u, v] comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the electro-optic component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
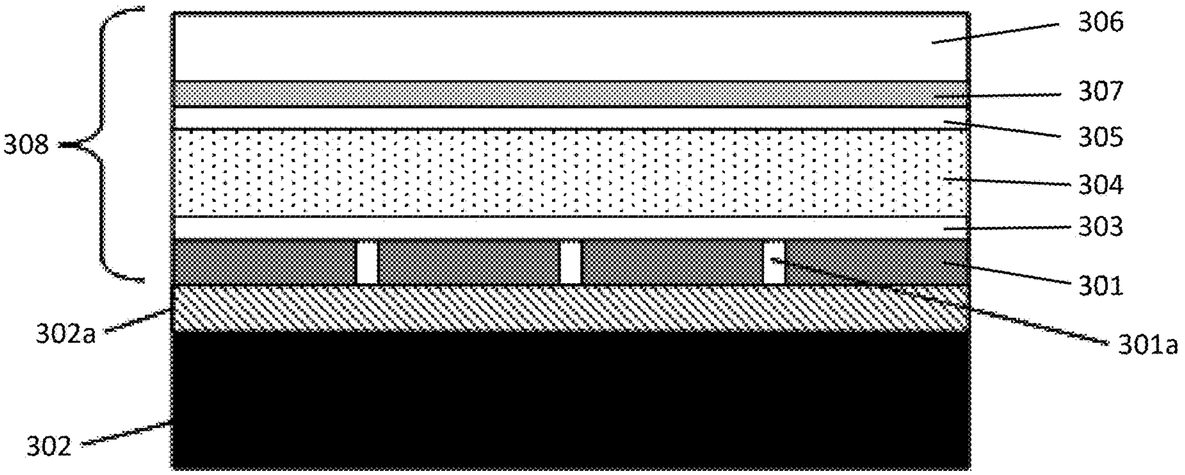
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Cell Configuration and Liquid Crystal Transition

The light-modulating layer in accordance with the present disclosure comprises liquid crystal arranged in a planar-aligned nematic (PAN) cell.

Figure 4A:
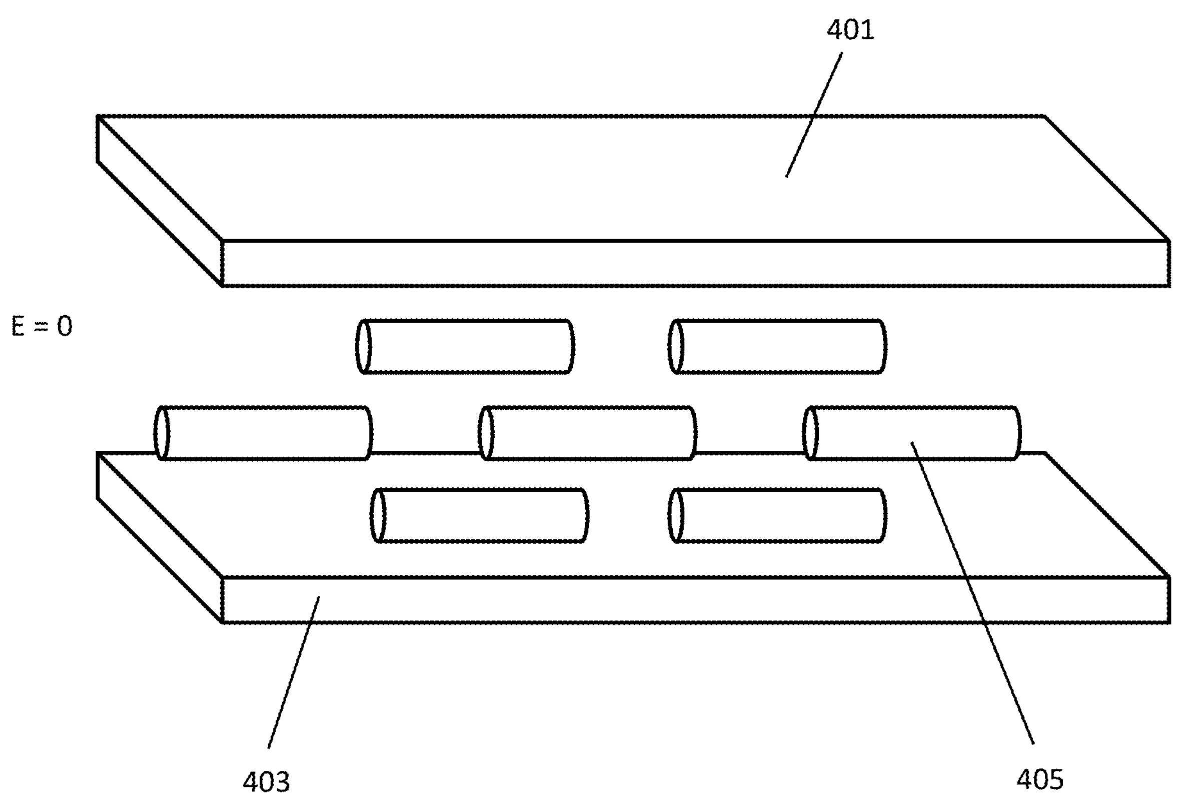
FIG. 4A shows a Freedericksz cell with the n-director in the planar state.
Figure 4B:
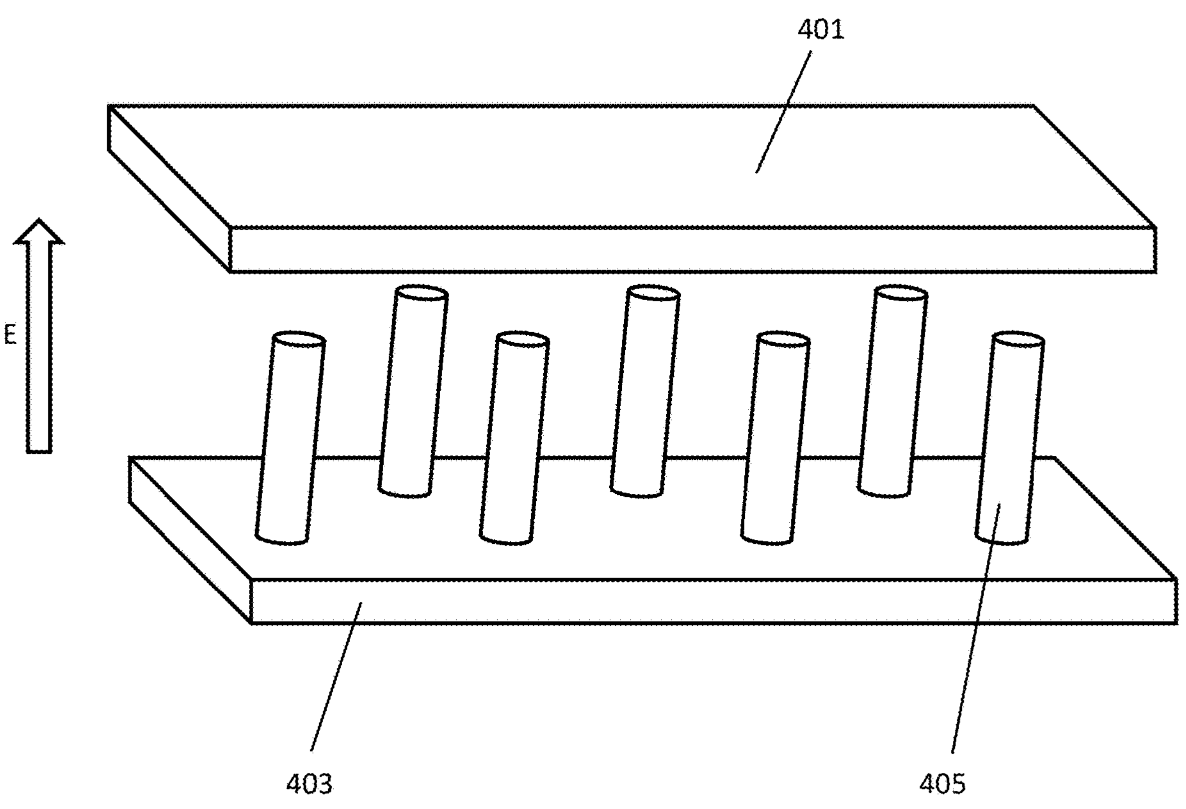
FIG. 4B shows a Freedericksz cell with the n-director in a homeotropic state due to the presence of an electric field, E.

The planar to homeotropic Freedericksz cell is also known as an Electrically Controlled Birefringence cell because when the voltage across the cell, having zero pre-tilt, exceeds the threshold voltage and the n-directors reorient in the electric field direction. This transition in orientation is known as the planar to homeotropic Freedericksz transition and is shown in FIGS. 4A and 4B. FIG. 4A shows the orientation of the liquid crystals in the absence of an electric field. FIG. 4B shows the alignment of the liquid crystals in the presence of a sufficient electric field between the first and second substrate. As a result of this transition the apparent birefringence is decreased for an incident ray of light. In the presence of a large voltage (one which is much larger than the threshold voltage) the n-directors are oriented perpendicular to the substrate, with the exception of those close to the aligning surface, this results in a very small phase retardation.

Figure 5:
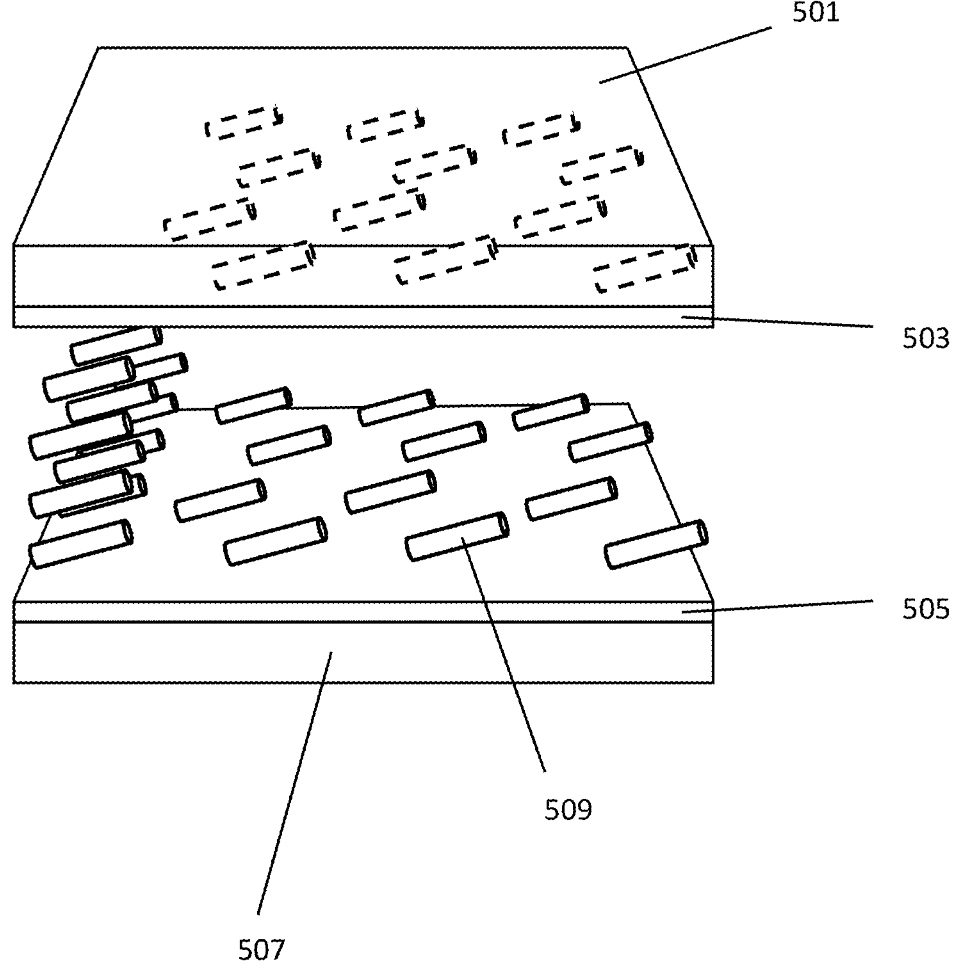
FIG. 5 is a schematic of an electrically-controlled birefringence liquid crystal on silicon device in accordance with embodiments.

In the presence of an electric field, the liquid crystal n-director can rotate in either direction (known as "forward tilt" or "reverse tilt"), in order to prevent this, an alignment layer with a built-in surface tilt, may be used. Often the alignment layer is a rubbed polymer, however, other methods may also be used to form the alignment layer. The alignment layer is applied to both substrates and for a standard ECB cell these layers are aligned in a parallel fashion as shown in FIG. 5. The planar-aligned liquid crystal cell makes an efficient phase modulator if the polarisation of the incoming light is parallel to the n-directors (long axis).

In more detail, FIG. 5 shows a first alignment layer 503 on a top glass substrate 501 and a second alignment layer 505 on a silicon backplane 507. A plurality of liquid crystal directors 509 are shown in FIG. 5 by way of example. In the absence of an electric field, the liquid crystal directors 509 align themselves in accordance with the first alignment layer 503 and second alignment layer 505. In this example, the first alignment layer 503 and second alignment layer 505 are considered parallel because the n-director of the liquid crystals proximate the top glass substrate 501 are parallel to the n-director of the liquid crystals proximate the silicon backplane 507. For example, parallel alignment layers may be formed by anti-parallel rubbing of the two alignment layers. That is, rubbing the first alignment layer in a first direction and rubbing the second alignment layer in a second direction, wherein the first direction is opposite to the second direction. In the example of FIG. 5, the first alignment layer 503 has been rubbed from right-to-left and the second alignment layer 505 has been rubbed from left-to-right (anti-parallel). Other methods of forming a parallel configuration are known in the art. In the presence of an electric field, liquid crystals may change orientation as shown in the previous figure.

The electrically controlled birefringence cell uses nematic liquid crystals with a positive dielectric anisotropy; this means that the cells switch quickly to the homeotropic state when an electric field applied across the cell exceeds the threshold voltage.

Figure 6:
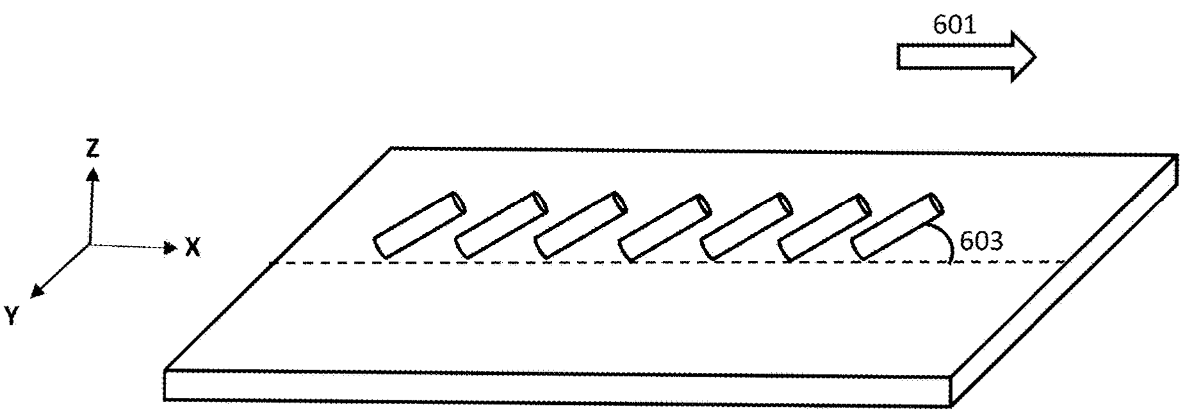
FIG. 6 shows liquid crystals having a polar pre-tilt angle in accordance with embodiments.

Typically, a low (approximately) 2° surface tilt rubbed polymer alignment layer is used on both the first substrate (e.g. front glass) and the second substrate (e.g. LCOS backplane). FIG. 6 illustrates the principle of rubbing polyimide (PI) materials in a rubbing direction 601 to create a surface pre-tilt angle 603 that is generally dependent on the type of PI used, coating conditions and the rubbing density. In embodiments, the first alignment direction provided by the first alignment layer is parallel to the second alignment direction provided by the second alignment layer.

Liquid Crystal Mixtures

Figure 7:
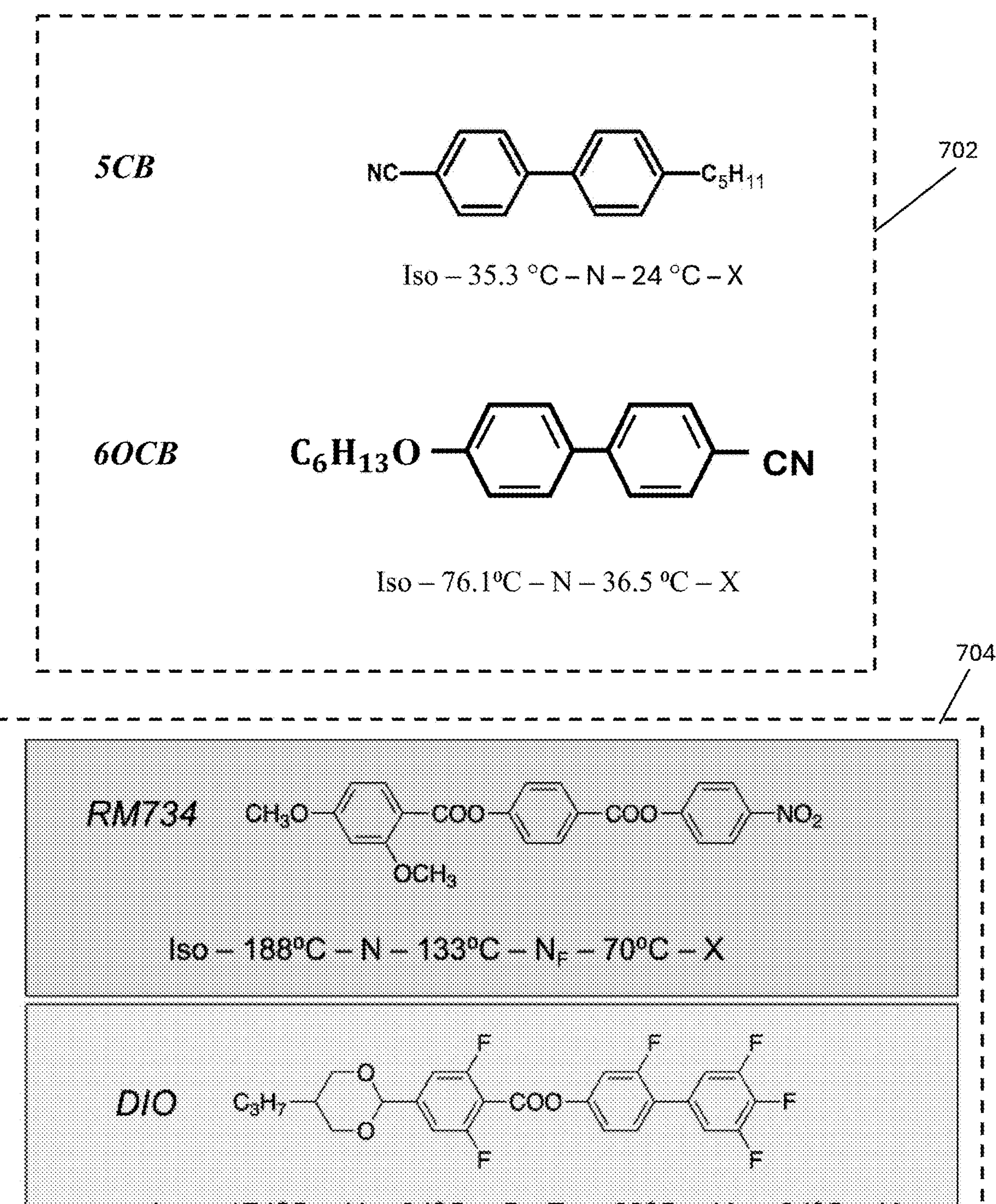
FIG. 7 shows example molecular structures and phase temperature ranges for liquid crystals suitable for use as the first liquid crystal component and second liquid crystal component.

According to aspects of the present disclosure, there is provided a liquid crystal mixture. In particular, the liquid crystal mixture comprises a first liquid crystal component and a second liquid crystal component. FIG. 7 shows examples of liquid crystal materials that may be used as part of the liquid crystal mixture. The liquid crystal molecules shown in box 702 may each be used as the first liquid crystal component. Specifically, the first liquid crystal component of the present disclosure has a nematic phase in a first temperature range. For example, the first liquid crystal component may comprise 5CB (the molecular structure of which is illustrated in FIG. 7) which has a nematic phase between 24 and 35.2° C. In other words, 5CB is nematic for a range of approximately 11.2° C. Below 24° C., 5CN transitions to a crystalline phase. Above 35.3° C., 5CB transitions to an isotropic phase.

Alternatively, the first liquid crystal component may comprise a different liquid crystal such as 60CB (the molecular structure of which is illustrated in FIG. 7) which has a nematic phase between 36.5 and 76.1° C. In other words, 60CB has a nematic phase across a range of 39.6° C. Below 36.5° C., 60CB transitions to a crystalline phase. Above 76.1° C., 60CB transitions to an isotropic phase.

The skilled person would be readily able to identify further examples of nematic liquid crystals having a nematic phase across a suitable temperature range. The present disclosure is not limited to the first crystal component comprising 5CB and/or 60CB specifically, which are shown by way of example only.

The liquid crystal molecules shown in box 704 may each be used as the second liquid crystal component. The second liquid crystal component according to the present disclosure exhibits a ferroelectric nematic phase in a second temperature range. For example, the second liquid crystal component may comprise RM734 (the molecular structure of which is illustrated in FIG. 7), which exhibits a ferroelectric nematic, Nf, phase between 7° and 133° C. In other words, RM734 exhibits an Nf phase across a range of 63° C. Above 133° C., RM734 exhibits a nematic phase, until 188° C. where it transitions to an isotropic phase. Below 70° C., RM734 transitions to a crystalline phase.

Alternatively, the second liquid crystal component may comprise DIO (the molecular structure of which is illustrated in FIG. 7), which exhibits an Nf phase between 34 and 69° C. In other words, DIO has an Nf phase across a temperature range of 35° C. Below 34° C., DIO transitions to a crystalline phase. Above 69° C., DIO transitions to a Smectic (SmZA) phase. Above 84° C., DIO transitions to a nematic phase, until 174° C. where DIO transitions to an isotropic phase.

As can be seen, different combinations of molecules from 702 and 704 have various overlapping nematic and Nf phase temperature ranges (third temperature range). Improved electro-optical performance may result from combinations of 702 and 704 which maximise the size of the overlapping temperature range.

Furthermore, the concentration of the second liquid crystal component (relative to the first liquid crystal component) is an important parameter that changes the electro-optical performance of the mixture.

Figure 8:
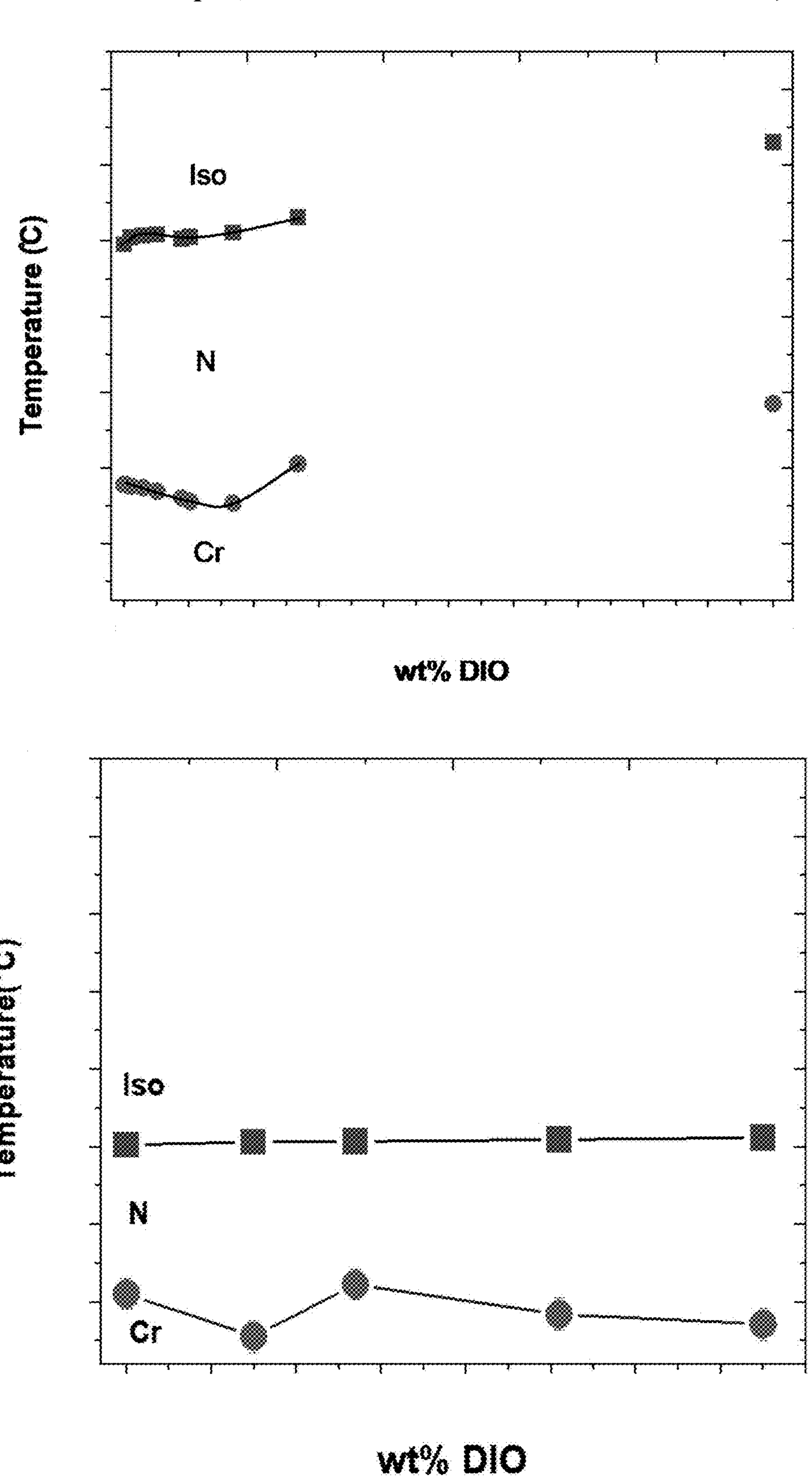
FIG. 8 shows phase diagrams as a function of Nf dopant DIO concentration for different first liquid crystal components.

FIG. 8 shows phase diagrams for mixtures of nematic and Nf phase liquid crystals. Specifically, graph (a) shows a phase diagram for a mixture comprising a sample nematic liquid crystal and DIO as a dopant across a range of DIO concentrations, measured using differential scanning calorimetry (DSC). As seen from graph (a), with the addition of greater concentrations of DIO, the nematic to isotropic transition temperature is increased. Furthermore, the mixture does not exhibit intermediate phases. In other words, the mixture itself exhibits a nematic phase despite the addition of Nf phase DIO, with no phase separation observed for any mixtures.

Graph (b) of FIG. 8 shows a phase diagram for different concentrations of DIO as a dopant in 60CB. Similarly, as in graph (a), there is no observed intermediate phase and no phase separation observed for measured concentrations of DIO.

Figure 9:
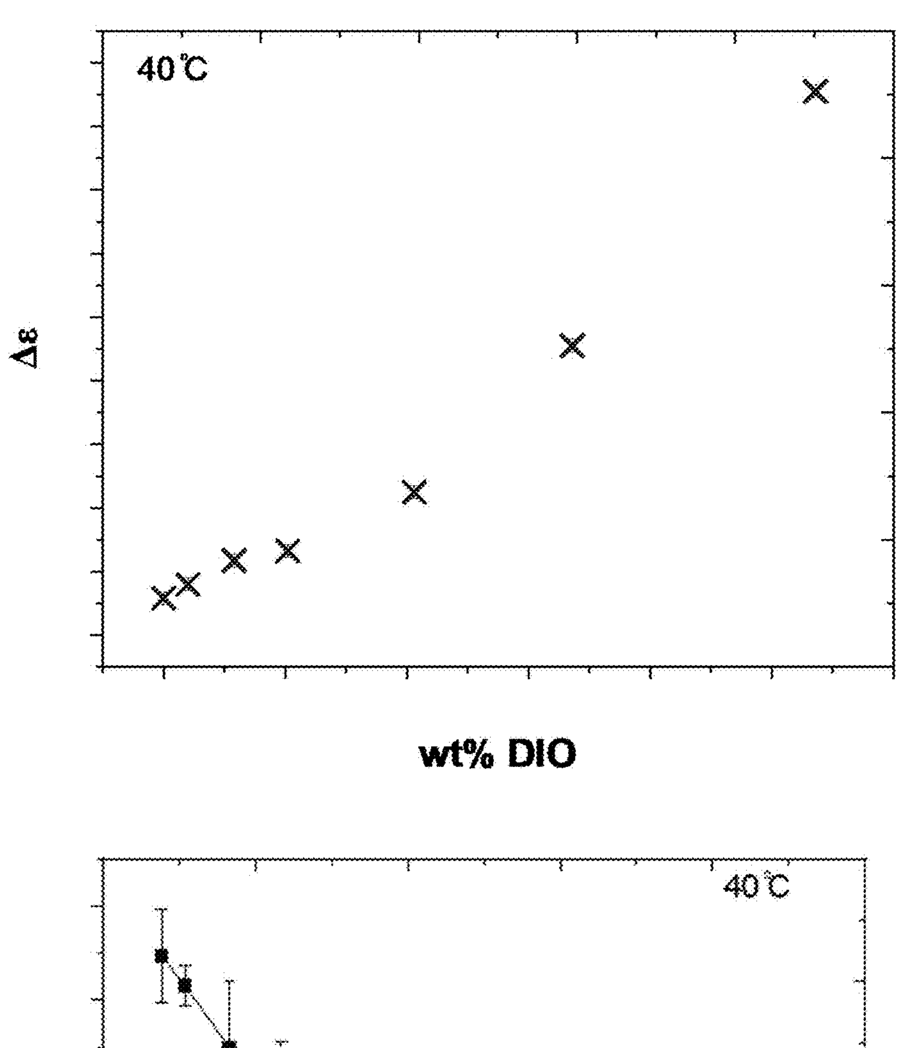
FIG. 9 shows the change in dielectric anisotropy and change in threshold voltage as a function of dopant DIO concentration for a first sample liquid crystal component.
Figure 9:
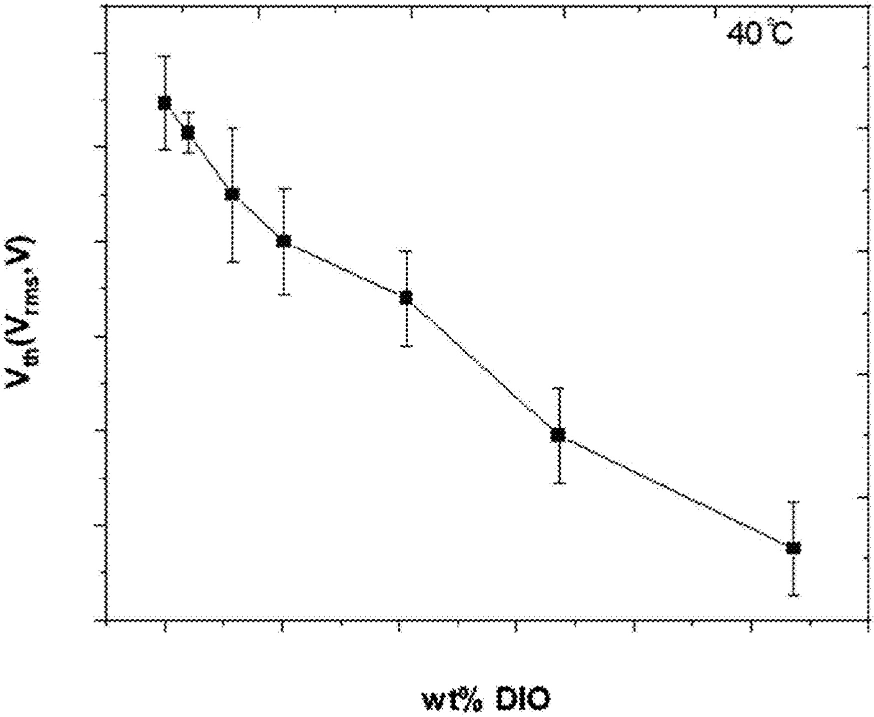

FIG. 9 shows the effect of increasing concentrations of DIO on the dielectric anisotropy of the liquid crystal mixture and the threshold voltage of the liquid crystal mixture. Graph (a) of FIG. 9 shows the addition of DIO in various concentrations to a sample nematic liquid crystal. The dielectric anisotropy was measured by fitting Freedericksz transition curves of the mixtures. As seen, the dielectric anisotropy increased with an increase in concentration of DIO. As increased by threefold for a high concentration of DIO. This increase in dielectric anisotropy led to a reduction in the threshold voltage (also measured by fitting Freedericksz transition curves of the mixtures) as shown in graph (b) of FIG. 9. The threshold voltage reduced by 38% for a concentration of 26.8 wt % DIO.

Figure 10:
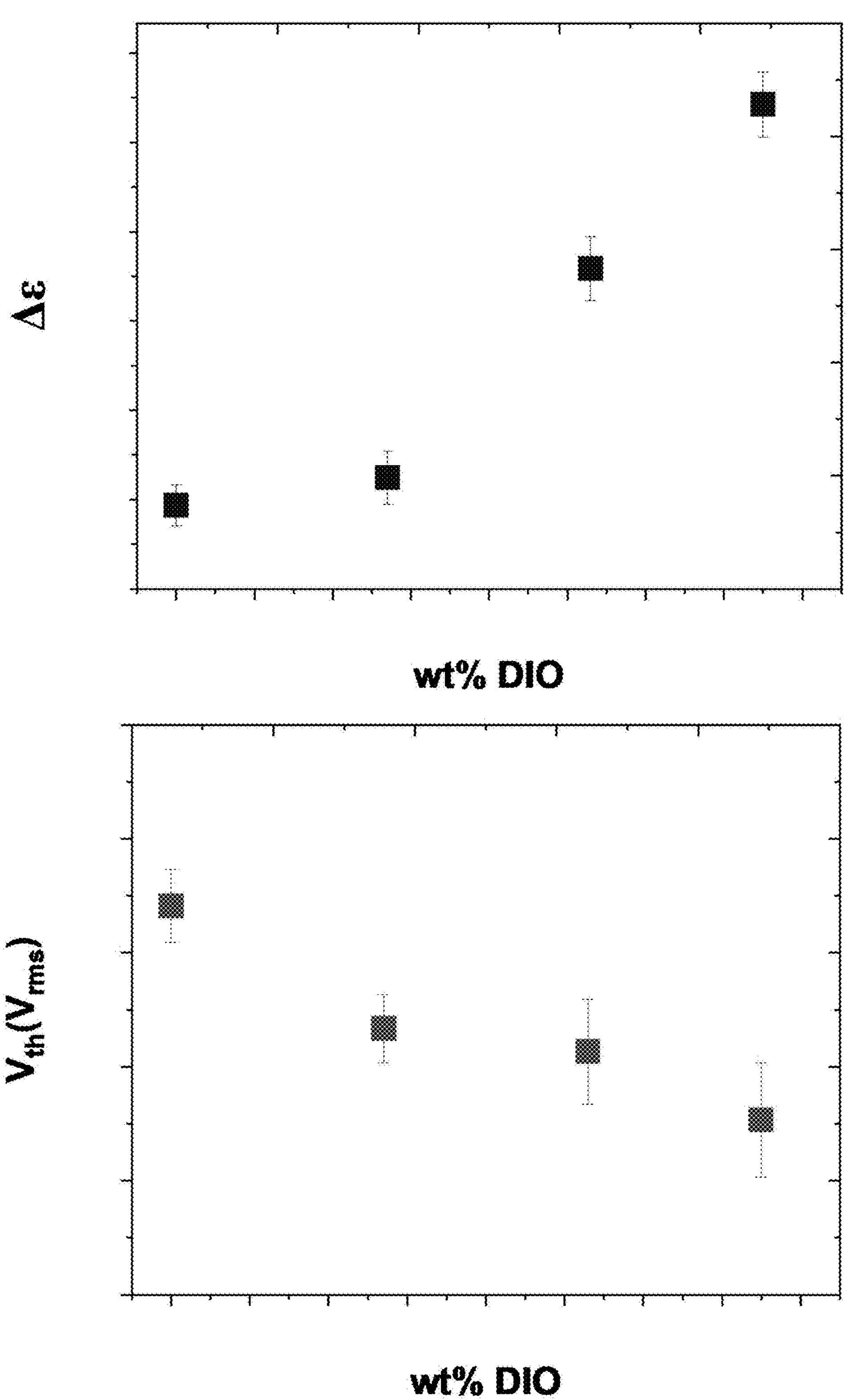
FIG. 10 shows the change in dielectric anisotropy and change in threshold voltage as a function of dopant DIO concentration for 6OCB acting as the first liquid crystal component.

FIG. 10 shows a similar pair of graphs as FIG. 9, but for a mixture of 60CB and DIO, for different concentrations of DIO as a dopant. As seen in graph (a) of FIG. 10, As of the mixture increased with increasing concentrations of DIO, with a corresponding reduction of threshold voltage. At a low concentration of DIO, this mixture provides a $\Delta_\varepsilon$ increase of 12%, and a threshold voltage decrease of 11%. Therefore, both of the mixtures represented in FIGS. 9 and 10 provide a decrease in threshold voltage, leading to a more power-efficient spatial light modulator.

Figure 11:
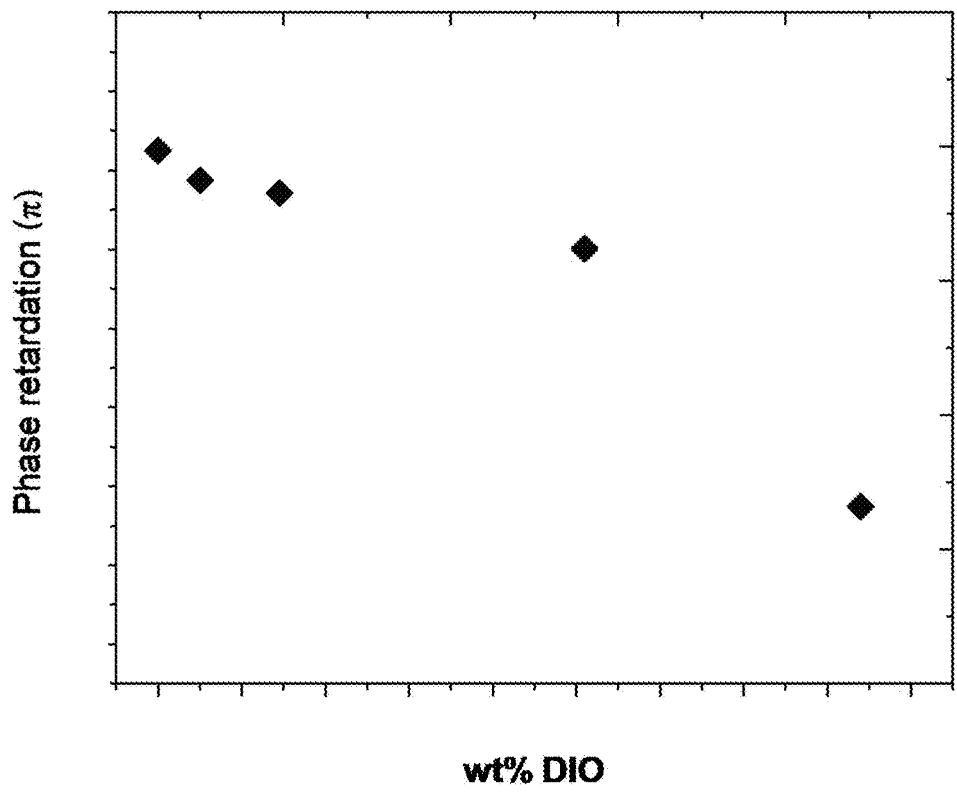
FIG. 11 shows the change in phase retardation for different concentrations of dopant DIO concentrations.

FIG. 11 shows a graph illustrating a change in phase retardation as a function of concentration of DIO for a sample nematic liquid crystal acting as the first liquid crystal component. As seen, there is non-linear behaviour across the concentration regime. In the lower concentration regime (e.g. between 2 and 6 wt % DIO), the phase retardation decreases slowly and in the higher concentration regime (e.g. above >6%) it decreases more rapidly. There has therefore been identified by the inventors a preferred range of DIO concentration of between 2 and 6 wt % DIO which provides a limited decrease in phase retardation, and decreased threshold voltage.

Figure 12:
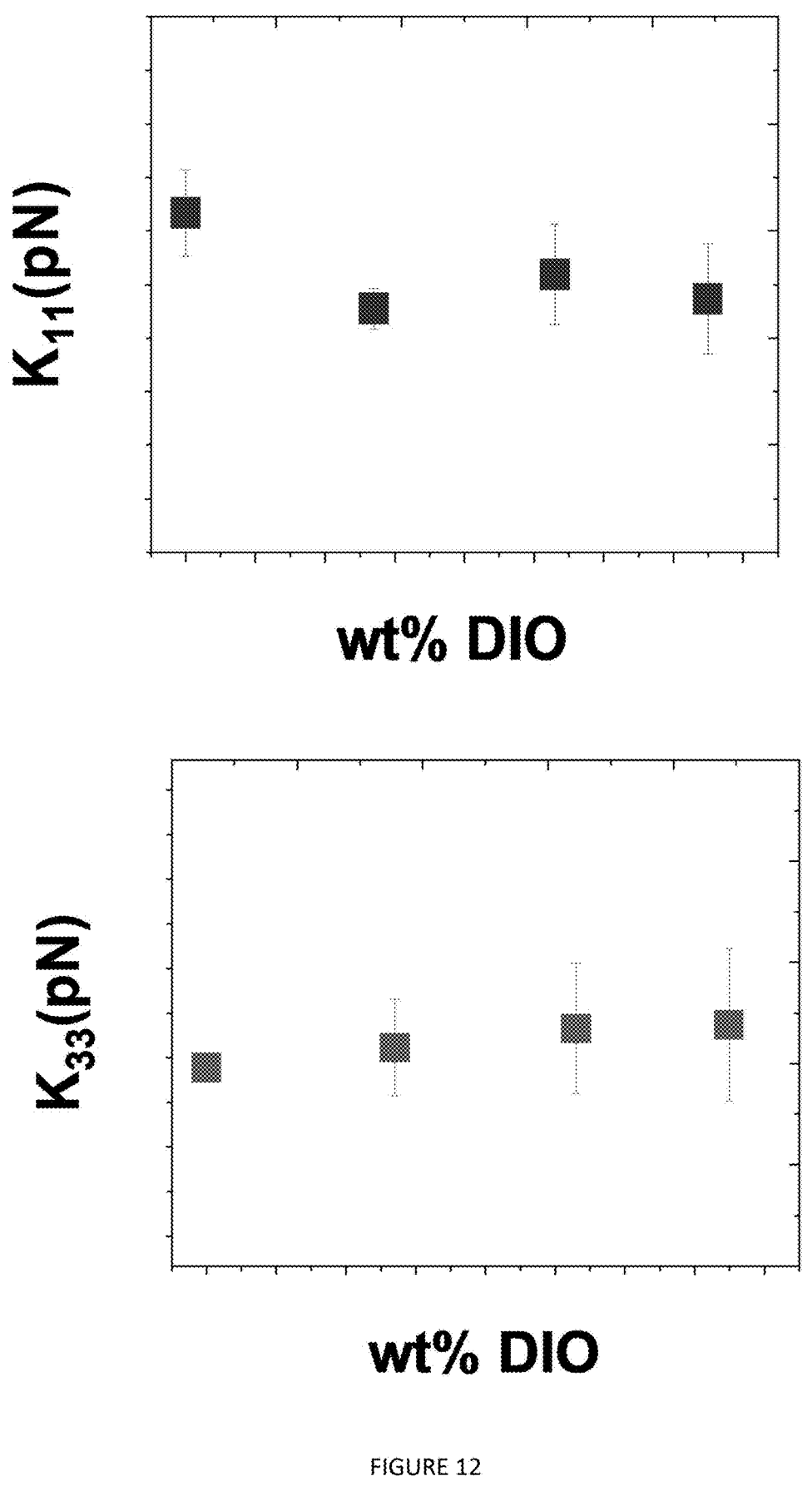

FIG. 12 shows, in graph (a), the effect of increased DIO concentration on the splay elastic constant of the mixture when DIO is added to nematic liquid crystal 60CB. As seen, there is only a slight decrease in the splay elastic constant of the mixture with increasing DIO concentration. Graph (b) shows that there is no meaningful change in the bend elastic constant of the mixture with increased DIO concentration.

Intermediate Pre-Tilt Alignment Layers

Figure 13:
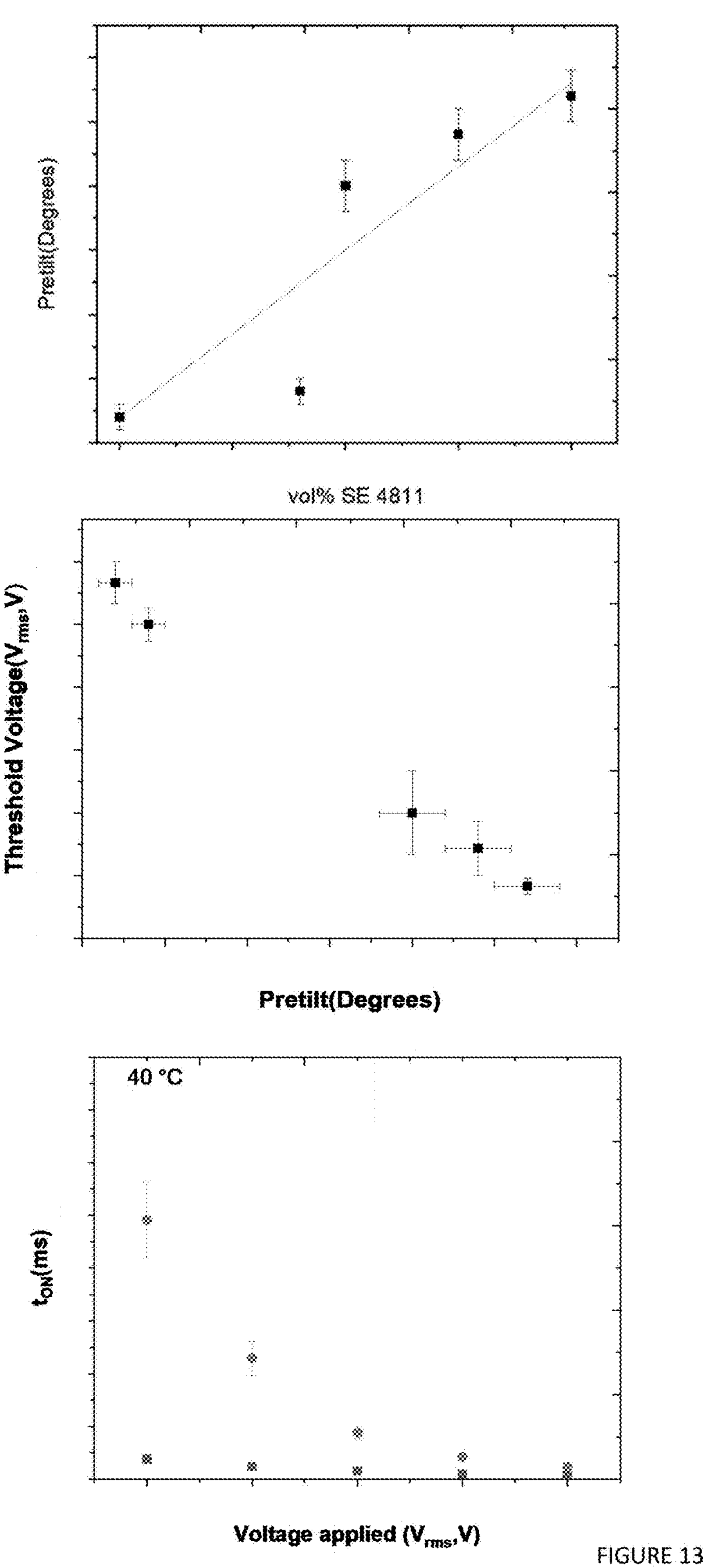
FIG. 13 shows the change in threshold voltage and response times for different intermediate pre-tilt angles.

FIG. 13 shows the effects of mixing two polymers having different associated pre-tilt angles at various concentrations. In this example, the first polymer is a polyimide (PI) having a low pre-tilt angle of approximately 2°-5°, and the second polymer is a PI (SE 4811) having a pre-tilt angle of 90°. The mixtures were fabricated by mixing the polymers and spin coating onto respective substrates and forming a liquid crystal cell by filling the cell gap with a nematic liquid crystal sample.

Graph (a) shows the change in overall pretilt of the mixture as a function of the percentage volume of SE 4811 added to the mixture. As seen, the overall pre-tilt angle increases as a function of percentage volume of SE 4811. The threshold voltage for each concentration from graph (a) is shown in graph (b), which shows a significant decrease in threshold voltage with increasing pre-tilt angle.

Finally, graph (c) shows the effect on response time (specifically on-time) as a function of applied voltage for overall pre-tilt of 2° (circular points) and 27° (square points). The on-time response is reduced significantly for higher pre-tilt angles. No meaningful change in off-time was observed for higher pre-tilt angles. It is envisaged that an intermediate pre-tilt angle alignment layer may be combined with nematic-Nf liquid crystal mixtures as described elsewhere herein, which also provide significant threshold voltage reductions, to provide embodiments having substantially lowered threshold voltages with very low power requirements.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A spatial light modulator comprising:

a first substrate comprising a first surface;

a second substrate comprising a second surface, the second substrate being positioned such that the second surface faces the first surface of the first substrate and is space apart therefrom to define a cell gap;

a first alignment layer disposed on the first surface of the substrate, the first alignment layer being configured to align liquid crystal molecules in a predetermined orientation;

a second alignment layer disposed on the second surface of the substrate; and a liquid crystal mixture disposed within the cell gap and between the first alignment layer and the second alignment layer, wherein the liquid crystal mixture is a non-phase separated mixture comprising:

a first liquid crystal component, the first liquid crystal component having a nematic phase in a first temperature range and a birefringence between 0.25 and 0.5, measured at a wavelength of 650 nm; and a second liquid crystal component, the second liquid crystal component having a ferroelectric nematic phase in a second temperature range, wherein the first temperature range and second temperature range at least partially overlap to define a third temperature range, such that when mixed within the third temperature range, the first liquid crystal component and second liquid crystal component form a non-phase-separated nematic phase liquid crystal mixture, wherein the spatial light modulator is arranged to provide electrically-addressable modulation of the phase of incident light.

2. The spatial light modulator of claim 1, wherein the second liquid crystal component comprises a fluorinated ferroelectric nematic molecule.

3. The spatial light modulator of claim 2, wherein the second liquid crystal component comprises DIO.

4. The spatial light modulator of claim 1, wherein the liquid crystal mixture comprises between 25 and 30% by weight of the second liquid crystal component.

5. The spatial light modulator of claim 1, wherein a ratio of the first liquid crystal component to the second liquid crystal component is in the range of 95:5 to 5:95.

6. The spatial light modulator of claim 1, wherein the liquid crystal mixture comprises between 1 and 10% by weight of the second liquid crystal component.

7. The spatial light modulator of claim 1, wherein the liquid crystal mixture comprises between 2 and 6% by weight of the second liquid crystal component.

8. The spatial light modulator of claim 1, wherein the cell gap between the first surface of the first substrate and the second surface of the second substrate is between 1 and 5 micrometres.

9. The spatial light modulator of claim 1, wherein the first alignment layer and/or the second alignment layer comprises a mixture of a first polymer having an associated first pre-tilt angle and a second polymer having an associated second pre-tilt angle, the mixture of the first polymer and the second polymer having an associated third pre-tilt angle, wherein the third pre-tilt angle is between the first pre-tilt angle and the second pre-tilt angle.

10. The spatial light modulator of claim 9, wherein the first pre-tilt angle is between 2 and 5 degrees, and the second pre-tilt angle is between 85 and 95 degrees.

11. The spatial light modulator of claim 10, wherein the mixture of the first polymer and the second polymer comprises a concentration of between 10 and 20% by volume of the second polymer.

12. A method of holographic projection comprising:

providing a spatial light modulator according to claim 1;

maintaining and operating the spatial light modulator at a temperature within the third temperature range;

applying a voltage pattern across the first substrate and second substrate to modulate the orientation of the liquid crystal mixture in accordance with a hologram; and illuminating the spatial light modulator with coherent light to form a spatially modulated wavefront.

13. The spatial light modulator of claim 1, wherein the first alignment layer has a pretilt of less than 5 degrees, the second alignment layer has a pretilt of less than 5 degrees;

the cell gap between the first surface of the first substrate and the second surface of the second substrate is between 1 and 5 micrometres.

14. The spatial light modulator of claim 13, wherein the liquid crystal mixture comprises between 2 and 6% by weight of the second liquid crystal component.

15. The spatial light modulator of claim 13, wherein the pretilt of the first alignment layer is in the range of 2-5 degrees, and the pretilt of the second alignment layer is in the range of 2-5 degrees.

16. The spatial light modulator of claim 14, wherein the pretilt of the first alignment layer is parallel to the pretilt of the second alignment layer.

17. The spatial light modulator of claim 15, wherein the liquid crystal mixture comprises between 2 and 6% by weight of the second liquid crystal component.

18. The spatial light modulator of claim 1, arranged to provide phase-only modulation to incident light.

19. A holographic projector comprising:

a spatial light modulator according to claim 1, configured to display a hologram by application of a voltage pattern; and a source of collimated light configured to illuminate the spatial light modulator, wherein the spatial light modulator being arranged to provide light encoded with a phase pattern corresponding to the hologram; and the holographic projector is configured to form a holographic reconstruction of the hologram at a replay field.

20. A holographic projector comprising:

a spatial light modulator according to claim 15, configured to display a hologram by application of a voltage pattern; and a source of collimated light configured to illuminate the spatial light modulator, wherein the spatial light modulator being arranged to provide light encoded with a phase pattern corresponding to the hologram; and the holographic projector is configured to form a holographic reconstruction of the hologram at a replay field.

* * * * *